United States Patent Office 3,522,045

Patented July 28, 1970

3,522,045

COPYING MATERIAL FOR USE IN THE PHOTOCHEMICAL PREPARATION OF PRINTING PLATES

Gerard Albert Delzenne and Urbain Leopold Laridon, Wilrijk-Antwerpen, Belgium, assignors to Gevaert-Agfa N.V., Mortsel, Belgium, a Belgian company No Drawing. Filed May 2, 1967, Ser. No. 635,407
Claims priority, application Great Britain, May 27, 1966, 24,012/66
Int. Cl. G03c *5/00*
U.S. Cl. 96—36 9 Claims

ABSTRACT OF THE DISCLOSURE

A copying material used in photochemical preparation of a printing plate including a support carrying a light sensitive composition containing nitro-benzene sulphenyl carboxylate. The photosensitive sulphenyl carboxylate having the formula:

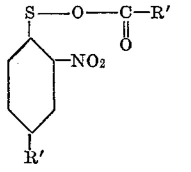

has acidic property when exposed to actinic light which produces a direct-positive image or printing plate.

This invention relates to the production of light-sensitive coatings for use in the manufacture of copying materials, more particularly of copying materials yielding positive images.

It is well known to produce so-called tanned images in a layer consisting of a colloid that is hardened by compounds produced by the action of light upon certain light-sensitive substances, which are homogeneously dispersed in that colloid. Among these light-sensitive substances are known salts of chromic acid, some diazo compounds, and the like. The colloids hardened by the action of light are capable of retaining greasy ink, or can be used for the photochemical production of printing plates. The printing plates obtained by these methods, however, are negative with respect to the master pattern, and further treatments are necessary to transform these negative printing images into images that are positive with respect to the master pattern.

It has been found now that a light-sensitive system based on the phototransformation of sulphenyl carboxylates can be used for recording and reproducing optical information, yielding direct-positive images or printing plates.

According to the invention a copying material for use in the photochemical preparation of printing plates is provided, which comprises a support having thereon a light-sensitive coating comprising at least one nitrobenzene sulphenyl carboxylate.

Especially valuable sulphenyl carboxylates are those corresponding to the general formula:

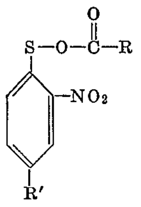

wherein:

R represents a lower alkyl group from 1 to 4 carbon atoms, a halogen-substituted lower alkyl group from 1 to 4 carbon atoms, an aryl group, a halogen substituted aryl group, a nitro-substituted aryl group, an aralkyl group or an alkaryl group, and R′ represents a hydrogen atom or a nitro group.

In general a polymer is added to the light-sensitive layer, especially when one intends to etch the images obtained on metallic supports, or to use them directly as printing plates. For such uses the said polymer is preferably an alkali-soluble polymer. As alkali-soluble polymers can be used copolymers of unsaturated carboxylic acids, such as acrylic acid, methacrylic acid, crotonic acid, maleic acid, fumaric acid, itaconic acid, and citraconic acid. If the copolymer comprises an unsaturated dicarboxylic acid, the half-esters and half-amides thereof may be used too. These unsaturated carboxylic acids are copolymerised with ethylenically unsaturated compounds, which are substantially insoluble in alkaline medium and which are present in the copolymer in such a proportion that the copolymer itself remains soluble in alkaline medium. Ethylenically unsaturated compounds that can be used for the copolymerisation are styrene and the derivatives thereof, vinyl chloride, vinylidene chloride, vinyl esters such as vinyl acetate, acrylates, methacrylates, acrylonitrile, methacrylonitrile, etc.

Preferred alkali-soluble polymers are copolymers of styrene and maleic anhydride and especially the so-called novolaks. According to British Standard 1755–1951 these are "soluble, fusible, synthetic resins produced from a phenol and an aldehyde, having no reactive groups (i.e. methylol groups) in the molecule and therefore incapable of condensing with other novolak molecules on heating without the addition of hardening agents."

The amount of alkali-soluble resin added to the light-sensitive coating may vary within wide limits, but in general at least one part by weight of alkali-soluble resin is present for every four parts by weight of sulphenyl carboxylate.

The light-sensitive coating consists of one or more sulphenyl carboxylates and occasionally of an alkali-soluble polymeric material. This coating may also comprise minor amounts of additives, which increase the light-sensitivity of the sulphenyl carboxylate.

Further, the light-sensitive coating may also comprise stabilisers, plasticisers, extenders, dyes and the like. By the term "light-sensitive composition" in the present description is meant the composition comprising the light-sensitive sulphenyl carboxylates, and if necessary, the alkali-soluble polymers and other additives.

The following are examples of sulphenyl carboxylates suitable for being incorporated into the copying material according to the invention:

2-nitrobenzenesulphenyl benzoate
2,4-dinitrobenzenesulphenyl acetate
2,4-dinitrobenzenesulphenyl trifluoroacetate
2,4-dinitrobenzenesulphenyl benzoate
2,4-dinitrobenzenesulphenyl (o-chlorobenzoate)
2,4-dinitrobenzenesulphenyl (p-chlorobenzoate)
2,4-dinitrobenzenesulphenyl (p-nitrobenzoate)
2,4-dinitrobenzenesulphenyl phenylacetate The sulphenyl carboxylates can be considered to be anhydrides resulting from the reaction of a carboxylic acid with a sulphenic acid. The sulphenic acids are derivatives of divalent sulphur. They do not exist as free acids but they are known by their derivatives. The synthesis of the sulphenyl carboxylates is based on the process described by Havlik and Kharasch in J. Am. Chem. Soc. 78 (1956) p. 1207.

The choice of the specific sulphenyl carboxylate for use in the manufacture of the light-sensitive coating composition mainly depends on its chemical stability.

In order to prepare a copying material according to the invention a support is coated with a solution of the sulphenyl carboxylate in an organic solvent or in a mixture of organic solvents which solvent(s) may include also an alkali-soluble polymer. Metal supports or supports coated with metals such as zinc and especially aluminium, are excellently suited as support materials for a printing plate. It is not strictly necessary to subject the metal supports to be used to any preliminary chemical treatment in order to render their surfaces suitable for accepting the light-sensitive layer. A simple mechanical roughening of the metallic surface proves to be quite sufficient for allowing an easy application of the light-sensitive layer, which firmly attaches itself to the metallic base in the form of a thin uniform film. For the production of planographic printing plates there can also be used, e.g., plates of stone or glass and also specially treated sheets of paper or plastic foils.

The base or support is coated by whirl-coating, brushing or spraying with a solution of the light-sensitive composition in a suitable solvent, and may be coated continuously on known coating machines, whereupon the solvent or solvent mixture is eliminated by known means such as evaporation, thus leaving a more or less thin coating of the light-sensitive composition upon the base or support. This thickness of the light-sensitive layer obtained may vary between approximately 0.5 and 20$\mu$, preferably between 1 and 5$\mu$. The light-sensitive coating is then ready for exposure to actinic light rays. The light source should preferably furnish an effective amount of ultraviolet radiation. Suitable sources of light are carbon arcs, xenon lamps, mercury vapour lamps, fluoroescent lamps, argon glow lamps, photographic flood lamps, tungsten lamps, etc.

The light-sensitive layer is exposed to actinic light through a transparent master pattern placed in contact therewith and consisting solely of opaque and transparent areas, i.e. the so-called line or half-tone positive or negative wherein the opaque areas are of the same optical density. However, it is also possible to expose the light-sensitive layer to a projected image.

It is believed that during exposure the light probably induces the photolytic decomposition of the sulphenyl carboxylate into fragments having an acidic character.

The development or removal of the coating in the exposed areas can be effected by means of water or an aqueous composition, preferably by means of an alkaline aqueous solution rapidly dissolving the fragments having acidic character, which are image-wise formed. An alkaline developer that can be used conveniently is an aqueous solution of an alkali metal phosphate such as sodium phosphate.

In the unexposed portions of the printing plate the presence of the unconverted sulphenyl carboxylate renders the light-sensitive layer insoluble in alkaline medium, even if an alkali-soluble polymer such as a novolak is present. Accordingly, the unexposed parts of the layer remain to form a positive image of the master pattern. These positive images can be used as printing plates, such as for planographic and offset printing. They may also be subjected to an etching process that renders them suitable for use in intaglio or relief printing.

After removal of the exposed areas of the light-sensitive layer by the developing solution, the ink-repellency of the unshielded areas of the base material can be improved by an after-treatment with a lithographic preparation for hydrophilising or enhancing the hydrophility of said areas. Compounds and compositions that are appropriate for this purpose are described, e.g., in British patent specification 946,538.

The ink-receptivity of the hydrophobic unexposed areas can be improved by treating the developed printing plate with a lacquer that adheres to the hydrophobic areas and forms an oleophilic deposit thereon. Suitable lacquers and the method for applying them are described in the British patent specification 968,706 and in the published Netherlands patent application 64/04916.

In order to prepare a printing form for gravure printing an exposure and etching technique is used, according to which cells can be formed in the base material in accordance with a screen pattern for receiving the printing ink.

Suitable base materials for etching are well known, particularly the base materials, which substantially consist of zinc, copper, steel, or an etchable magnesium alloy.

In order to prepare a planographic printing plate a base material preferably a zinc sheet is chosen, which base material is appropriate for lithographic printing.

A special advantage of the use of the sulphenyl carboxylates according to the invention is the easy way in which these products can be synthesized. Further, the solubility of the light-sensitive system and also the solvent, which will be applied to "develop" the photographic image, can be adapted to the final destination of the photosensitive material. A further advantage of the present light-sensitive compositions is that they can be prepared a considerable time before use.

The sulphenyl carboxylates cannot only be incorporated into copying material for use in the photochemical preparation of printing plates but they can also be employed for the formation of photographic images.

As indicated above the photolytic decomposition of the sulphenyl carboxylates results in the formation of fragments having acidic character. When this photolytic decomposition takes place image-wise, the formation of acid too occurs image-wise. In that case visible images can be produced, e.g., by detecting the image-wise formed acid with suitable pH-indicators, for which purpose any compound can be used that changes colour in the presence of an acid.

EXAMPLE 1

A solution of 200 ccs. of distilled ethylene bromide, 15.2 g. of bis(2,4-dinitrophenyl) disulphide, and 1 g. of iodine was brought in a 1 l. three-necked flask provided with a reflux condenser and a vapour inlet. The mixture was heated on an oil-bath at 120–130° C. while chlorine was conducted therein for 4 hours till a clear solution was obtained. After having been cooled the mixture was filtered and evaporated in vacuo. Subsequently the crude product was recrystallised from 300 ccs. of carbon tetrachloride. Pure 2,4-dinitrobenzenesulphenyl chloride melting at 95° C. was obtained. A mixture of 5 g. of the 2,4-dinitrobenzenesulphenyl chloride, 17.6 g. of freshly molten sodium acetate and 150 ccs. of dry freshly distilled benzene were shaken for 22 h. in a sealed flask. The mixture was then filtered and the resulting residue was washed with 250 ccs. of anhydrous ethylene chloride in order to extract all product from the precipitate. The solution formed was added to the first filtrate and the total bulk was evaporated in vacuo. The residue was dissolved in 250 ccs. of benzene and the solution was filtered and evaporated. Yellow needles of 2,4-dinitrobenzenesulphenyl acetate were separated. They turned orange on increasing the temperature to 90–105° C. and later on red and black. Melting point: 132° C.

An amount of 5 g. of 2,4-dinitrobenzenesulphenyl acetate and 5 g. of novolak was dissolved in 300 ccs. of acetone. The resulting solution was applied to an aluminium foil in such a way that upon evaporation of the solvent a layer remained having a thickness of approximately 3μ.

This layer was exposed through a line original, placed in contact therewith by means of an 80 watt high pressure mercury vapour lamp placed at a distance of 15 cm.

The development was executed with a solution of 2.5 g. of sodium carbonate in 100 ccs. of water and 25 ccs. of ethylene glycol monomethyl ether. During this development step the exposed areas were washed away. After development, the unshielded aluminium at the exposed areas was rendered more hydrophilic by means of a 1% aqueous solution of phosphoric acid, whereupon the printing plate was inked. In order to obtain a good positive printing plate an exposure time of 5 minutes sufficed.

EXAMPLE 2

The preparation of Example 1 was reiterated, with the proviso, however, that instead of sodium acetate, sodium phenylacetate was made to react with the 2,4-dinitrobenzenesulphenyl chloride. An amount of 5 g. of the resulting 2,4-dinitrobenzenesulphenyl phenylacetate was dissolved together with 5 g. of novolak in 300 ccs. of acetone. Analogously to Example 1, a layer having a thickness of approximatively 3μ was applied to an aluminium foil. The resulting material was exposed through a line transparency with the aid of an 80 watt high pressure mercury vapour lamp placed at a distance of 15 cm. The development was carried out in a solution of 2.5 g. of sodium carbonate in 100 ccs. of water and 25 ccs. of ethylene glycol monomethyl ether. In this way the exposed areas were washed away. In order to hydrophilize the unshielded aluminium, the foil was also treated with a 1% aqueous solution of phosphoric acid. Subsequently the plate could be inked.

An exposure time of 5 minutes sufficed for obtaining a relief image of good quality.

EXAMPLE 3

The process of Example 2 was repeated, with the proviso, however, that for the production of the light-sensitive layer a solution of 5 g. of 2,4-dinitrobenzenesulphenyl phenylacetate and 10 g. of novolak in 400 ccs. of acetone was used. An exposure time of 5 minutes with a 80 watt high-pressure mercury vapour lamp placed at a distance of 15 cm. sufficed for obtaining a good relief image with the same developer as described in Example 2.

EXAMPLES 4 AND 5

By allowing to react 2,4-dinitrobenzenesulphenyl chloride according to the reaction scheme of Example 1 with:

(a) sodium benzoate
(b) sodium trifluoroacetate 2,4-dinitrobenzenesulphenyl benzoate and 2,4-dinitrobenzenesulphenyl trifluoroacetate respectively were obtained. The following treatment was then carried out with each of these compounds.

An amount of 5 g. of each of them was dissolved each time together with 5 g. of novolak in 300 ccs. of acetone. The coating of the light-sensitive layers and the exposure thereof were performed as described in Example 1. The developer consisted of 2.5 g. of sodium carbonate in 100 ccs. of water and 30 ccs. of ethylene glycol monomethyl ether. In this case an after-treatment of the unshielded aluminium could be carried out also with a 1% aqueous solution of phosphoric acid. The results are listed in the following table.

| Ex. | Light-sensitive compound | Exposure time required |
|---|---|---|
| 4 | 2,4-dinitrobenzenesulphenyl benzoate | 10′ |
| 5 | 2,4-dinitrobenzenesulphenyl trifluoroacetate | 10′ |

The light-sensitive solution consisting of 5 g. of 2,4-dinitrobenzenesulphenyl benzoate and 5 g. of novolak in 300 ccs. of acetone described in Example 4 could equally well be coated on a zinc support. After exposure and development the resulting positive relief image could be utilised as a planographic printing plate. For this purpose the relief-image was rubbed with an aqueous fixing solution containing 4% by weight of potassium hexacyanoferrate (II), 20% by weight of gum arabic and 1% by weight of phosphoric acid.

A hydrophobic lacquer, e.g. of the class of hydrophobic lacquers described in the British patent specification 968,706 and the published Netherlands patent application 64/04916, was applied to the remaining parts of the light-sensitive layer to strength them. In this way a planographic printing plate having great wear resistance was obtained. A high number of copies could be obtained by means of this printing plate.

The unshielded parts of the zinc support, which had been bared during development by dissolving away the exposed parts of the light-sensitive layer, could also be subjected to an etching process, the remaining parts of the light-sensitive layer serving as the etching resist. The etching solution was a 10% aqueous solution of nitric acid. A plate suitable for letterpress printing was obtained.

EXAMPLES 6 AND 7

In the reaction scheme of Example 1 sodium acetate was replaced by:

(1) the sodium salt of o-chlorobenzoic acid
(2) the sodium salt of p-chlorobenzoic acid.

2,4-dinitrobenzenesulphenyl(o-chlorobenzoate) and 2,4-dinitrobenzenesulphenyl(p-chlorobenzoate) were obtained respectively. An amount of 5 g. of each of these compounds was dissolved each time together with 5 g. of novolak in 300 ccs. of acetone and 100 ccs. of the ethylene glycol monomethyl ether. The coating of the light-sensitive layer and the exposure were carried out in the same way as in Example 1. The developer was composed of a solution of 2.5 g. of sodium carbonate in 100 ccs. of water and 5 ccs. of ethylene glycol monomethyl ether. The exposed areas were washed away therewith. The unshielded aluminium could be made more hydrophilic with a 1% aqueous solution of phosphoric acid. The results are listed in the following table.

| Ex. | Light-sensitive compound | Exposure time required |
|---|---|---|
| 6 | 2,4-dinitrobenzenesulphenyl(o-chlorobenzoate) | 10′ |
| 7 | 2,4-dinitrobenzenesulphenyl(p-chlorobenzoate) | 10′ |

EXAMPLE 8

An amount of 10 g. of bis(2-nitrophenyl) disulphide, 25 ccs. of dry ethylene chloride and 1 drop of fuming sulphuric acid was brought in a 250 ccs. flask provided with a stirrer, a reflux condenser, and a vapour inlet. Chlorine vapour was then introduced while stirring till absorption manifested itself. The vapour influx was continued till a clear solution was obtained. During the latter treatment the reaction mixture was placed on a waterbath at 20° C. After the end of the reaction the mixture was stirred for another hour. After having been cooled, the reaction mixture was filtered and the residual chlorine was eliminated. Subsequently 40 ccs. of dimethyl ether are added. The precipitate was filtered with suction and washed with cold ether. Melting point of the resulting 2-nitrobenzenesulphenyl chloride: 75° C.

The process of Example 1 was then repeated, with the proviso, however, that 2,4-dinitrobenzenesulphenyl chloride was replaced by 2-nitrobenzenesulphenyl chloride and sodium acetate was replaced by sodium benzoate. An amount of 10 g. of the resulting 2-nitrobenzenesulphenyl benzoate was dissolved together with 10 g. of novolak in 500 ccs. of acetone. The coating of the layer and the exposure were identical with those described in Example 1.

The developer was composed of a solution of 2.5 g. of sodium carbonate in 100 ccs. of water and 5 ccs. of ethylene glycol monomethyl ether. The exposed areas were washed away therewith. The material was then treated with a 1% aqueous solution of phosphoric acid.

When using 2-nitrobenzenesulphenyl benzoate as light-sensitive substance an exposure time of 150 sec. sufficed.

EXAMPLE 9

An amount of 5 g. of 2,4-dinitrobenzenesulphenyl benzoate as in Example 4 and 5 g. of copolymer of styrene and maleic anhydride were dissolved in 300 ccs. of acetone. The resulting solution was applied to an aluminium foil in such a way that a layer having a thickness of approximately 5$\mu$ was obtained upon evaporation of the acetone. The resulting light-sensitive layer was placed in contact with a line original and exposed therethrough for 10 minutes by means of a 80 watt high pressure mercury vapour lamp placed at a distance of 15 cm.

Subsequently, the layer was developed with an aqueous solution comprising 3% by weight of trisodium phosphate, 0.5% by weight of sodium hydroxide and 20% by weight of sodium chloride in order to remove the exposed areas.

In order to render the unshielded aluminium more hydrophilic, the plate was treated with a 1% aqueous solution of phosphoric acid. Occasionally, the plate could be inked and used in offset printing techniques.

EXAMPLE 10

Example 1 was repeated but sodium acetate was replaced by an equivalent amount of the sodium salt of p-nitrobenzoic acid, which yielded 2,4-dinitrobenzenesulphenyl p-nitrobenzoate. An amount of 5 g. of this compound was dissolved together with 5 g. of novolak in 300 ccs. of acetone.

Coating of the light-sensitive layer and exposure were carried out in the same way as described in Example 1.

The development was executed with a solution of 2.5 g. of sodium carbonate in 100 ccs. of water.

In order to obtain a relief image of good quality an exposure time of 10 minutes sufficed.

What we claim is:

1. Copying material for use in the photochemical preparation of printing plates including a support carrying a light-sensitive coating that contains at least one sulphenyl carboxylate corresponding to the following general formula:

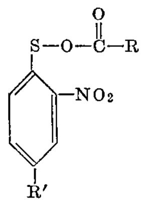

wherein:

R is a lower alkyl group of 1 to 4 carbon atoms, a halogen-substituted lower alkyl group of 1 to 4 carbon atoms, an aryl group, a halogen-substituted aryl group, a nitro-substituted aryl group, an aralkyl group, or an alkaryl group, and R' is hydrogen or nitro.

2. Copying material according to claim 1, wherein the light-sensitive coating also comprises an alkali-soluble polymer.

3. Copying material according to claim 2, wherein at least one part by weight of alkali-soluble polymer is present for every four parts by weight of sulphenyl carboxylate.

4. Copying material according to claim 2, wherein the alkali-soluble polymer is a novolak resin.

5. Copying material according to claim 2, wherein the alkali-soluble polymer is a copolymer of styrene and maleic anhydride.

6. Copying material according to claim 1, wherein the sulphenyl carboxylate is 2,4-dinitrobenzenesulphenyl benzoate.

7. Process for the photochemical preparation of a printing plate, comprising exposing to actinic light through a master pattern a copying material including a support carrying a light-sensitive coating that contains at least one sulphenyl carboxylate corresponding to the following general formula:

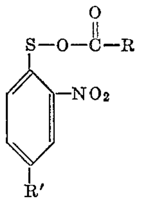

wherein:

R is a lower alkyl group of 1 to 4 carbon atoms, a halogen substituted lower alkyl group of 1 to 4 carbon atoms, an aryl group, a halogen-substituted aryl group, a nitro-substituted aryl group, an aralkyl group, or an alkaryl group, and R' is hydrogen or nitro, and developing the resulting positive image by dissolving away the exposed portions of the coating in an aqueous alkaline liquid.

8. Process as outlined in claim 7, wherein the developer is an aqueous solution of sodium phosphate.

9. Process as outlined in claim 7, including the step of etching the developed plate for producing a positive relief printing plate.

References Cited

UNITED STATES PATENTS 3,320,171 5/1967 Fishaber ------------ 154—14

OTHER REFERENCES

Barton D., Chow Y., Cox A., and Kirby G. (Imp. Coll., London). J. Chem. Soc. 1965 (June) pp. 3571–8.

NORMAN G. TORCHIN, Primary Examiner

J. GOODROW, Assistant Examiner

U.S. Cl. X.R.

96—36.3, 88; 156—13, 14; 260—158